United States Patent [19]

Maali

[11] Patent Number: 5,349,378
[45] Date of Patent: Sep. 20, 1994

[54] CONTEXT INDEPENDENT FUSION OF RANGE AND INTENSITY IMAGERY

[75] Inventor: Fereydoun Maali, New York, N.Y.

[73] Assignee: Robotic Vision Systems, Inc., Hauppauge, N.Y.

[21] Appl. No.: 993,393

[22] Filed: Dec. 21, 1992

[51] Int. Cl.$^5$ .................................. H06N 13/02
[52] U.S. Cl. .................................. 348/46; 348/187; 348/135; 348/44; 901/47
[58] Field of Search .................. 358/88, 107, 139; 901/47; 348/44, 46, 135, 187; H04N 7/18, 13/02

[56] References Cited

U.S. PATENT DOCUMENTS

| | | | |
|---|---|---|---|
| 4,396,945 | 8/1983 | DiMatteo | 358/107 |
| 4,654,699 | 3/1987 | Medina | 358/88 |
| 5,081,530 | 1/1992 | Medina | 358/88 |
| 5,283,640 | 2/1994 | Tilton | 348/42 |

Primary Examiner—Howard W. Britton
Attorney, Agent, or Firm—Max Fogiel

[57] ABSTRACT

A method and apparatus for fusion of three dimensional data due to an active optical triangulation based vision sensor, and two-dimensional data obtained from an independent TV camera. The two sensors are aligned so that their view volumes are partially overlapped. In the course of a calibration process, a planar target is placed and depressed through the common view volume of the two sensors. The illuminant of vision sensor projects a stripe onto the target. As the stripe is traversed across the target incrementally, it is imaged at every position not only by the camera of the vision sensor, but also by the independent TV camera. The calibration process yields a table which connects the resolution cells of the TV camera to a set of rays whose equations are established in the coordinate measurement system of the three dimensional vision sensor. The calibration table is subsequently used to inter-relate points in either sensory space via their connecting rays.

13 Claims, 8 Drawing Sheets

CONTEXT INDEPENDENT FUSION OF RANGE AND INTENSITY IMAGERY

BACKGROUND OF INVENTION

Data fusion refers to the process of associating or corresponding heterogeneous sensory data, in this instace three dimensional data due a known active optical triangulation based sensor, S3, and an independent TV camera, S2. While S3 provides unambigous three dimensional coordinates of the underlying surface, S2 provides the intensity data associated with such a scene.

Data fusion can, however, be effected at different levels of abstraction. Conventionally, when fusion is effected at pixel level for range and intensity imagery, the fused region is confined to specific spatial structures -e.g. landmarks, edges, curves- that can be detected in both sensory spaces. Hence such a fusion is constrained by the scene context.

The process of data fusion, as intended here, enables to attach intensity values to every surface point imaged through S3 and S2 and vice versa. When S2 is a color camera, the points obtained through S3 can be attached to suitable color coordinates.

It is an objective of this ivnention to effect such data fusion even for "featureless" scenes or surfaces. It is a further objective of this invention to effect such data fusion from sub pixel to coarser resolutions as well as at higher levels of abstraction such as segmented images or classified targets.

Data fusion as described herein can prove valuable in feature selection and hence pattern classification in general and image segmentation and object classification in particular, as fused data expand the domain in which uncorrelated features may be sought. The field of robotic vision and applications such as automated assembly and industrial inspection therein can greatly benefit from such enriched sensory data. The invention can also greatly benefit rendering of range imagery when S2 is a color camera.

Data fusion as described herein is centered around a self scanned three dimensional sensor, S3, and a calibration process. A self scanned sensor can effect a controlled relative motion between its projected laser stripe and the TV camera, S2, that may even be attached to S3's enclosure. The calibration process yields a "data fusion table" that connects the resolution cells in the S2 space to rays whose equations are established in the S3 space.

When a scene is imaged through a set of multiple 3D sensory sources the problem of adjacency of the resulting data can prove difficult. Data fusion tables may equally be created for an arrangement of two 3D sensors and a an independent TV camera and facilitate the solution.

It is also shown how to effect data fusion for single-plane-of-light sensors whose projected light stripe moves in tandem with S2.

Throughout this disclosure the illuminant of S3 is assumed to be a laser source, radiating a beam of light which is optically converted into a plane that in turn projects a light stripe onto the underlying surface. The said data fusion is, however, equally applicable when S3 is a flying spot based three dimensional sensor.

SUMMARY OF THE INVENTION

It is the objective this invention to enable complete fusion of the said sensory data and not be constrained by the scene context. That is the fused regions are not confined to specific spatial or spectral structures of the scene.

It is moreover the objective of this invention to effect such data fusion from sub pixel to arbitrary coarser resolutions.

Information association at more abstract levels- such as segmented image regions or classified targets is an obvious extension.

It is recongnised that for some sensor geometries the data fusion region may fall well short of the common view volume of the two sensory systems. Methods to expand the data fusion region are also presented herein.

A first embodiment of the present invention comprises the steps of aligning a self scanned 3D sensor, S3, 30, and a TV camera, S2 20; placing the target 52 -a planar slab- within the common view volume 50 of the two sensors; imaging the laser stripe of S3, 34 by the two said sensory systems as it traverses across the said target; centroiding 301, thinning 203 filtering 307, 207 and least squares fitting 309, 209 and sampling the imaged stripes in both sensory spaces; and deriving corresponding point sets in the said sensory spaces; repeating the latter step as the target is depressed through the said common view volume; least squares fitting 3D lines to points in 3-space pertaining to various target position corresponding to each resolution cell of the S2 space.

A second embodiment of the invention is concened with extension of the data fusion region along the laser stripe of S3, 34, through extrapolation.

A third embodiment of the present invention employs circular target instead of the rectangular target of the first two embodiments. Here data fusion region established in the course of said calibration can be expanded in both directions- vertically and laterally.

A fourth embodiment of the invention employs and additional self scanned 3D sensor only in the calibration process to expand the fusion region in all direction.

The three dimensional sensor in the first four embodiments of the present invention are of self-scanned type 30. The operational significance of such a sensor is that its laser stripe is driven across the target through the motion of a stepper motor 35 which is an integral part of the sensor itself. In contrast, a fused sensory source that employs a single-plane-of-light based sensor 130 as its 3D sensor, requires a relative motion to traverse its laser stripe across the target. An instance of this arises in robot mounted sensory systems. A fifth and a sixth embodiments of the present invention employ a self scanned sensor additionally only during the calibration process, as in earlier embodiments, followed by a registration process for which a special test pattern is presented.

During run-time S2 can also operate under an ambient lighting other than that provided by the laser source of the 3D sensor in which case it should be stripped of the spectral notch filter used during calibration.

DESCRIPTION OF THE PREFERRED EMBODIMENT

Figure 1:
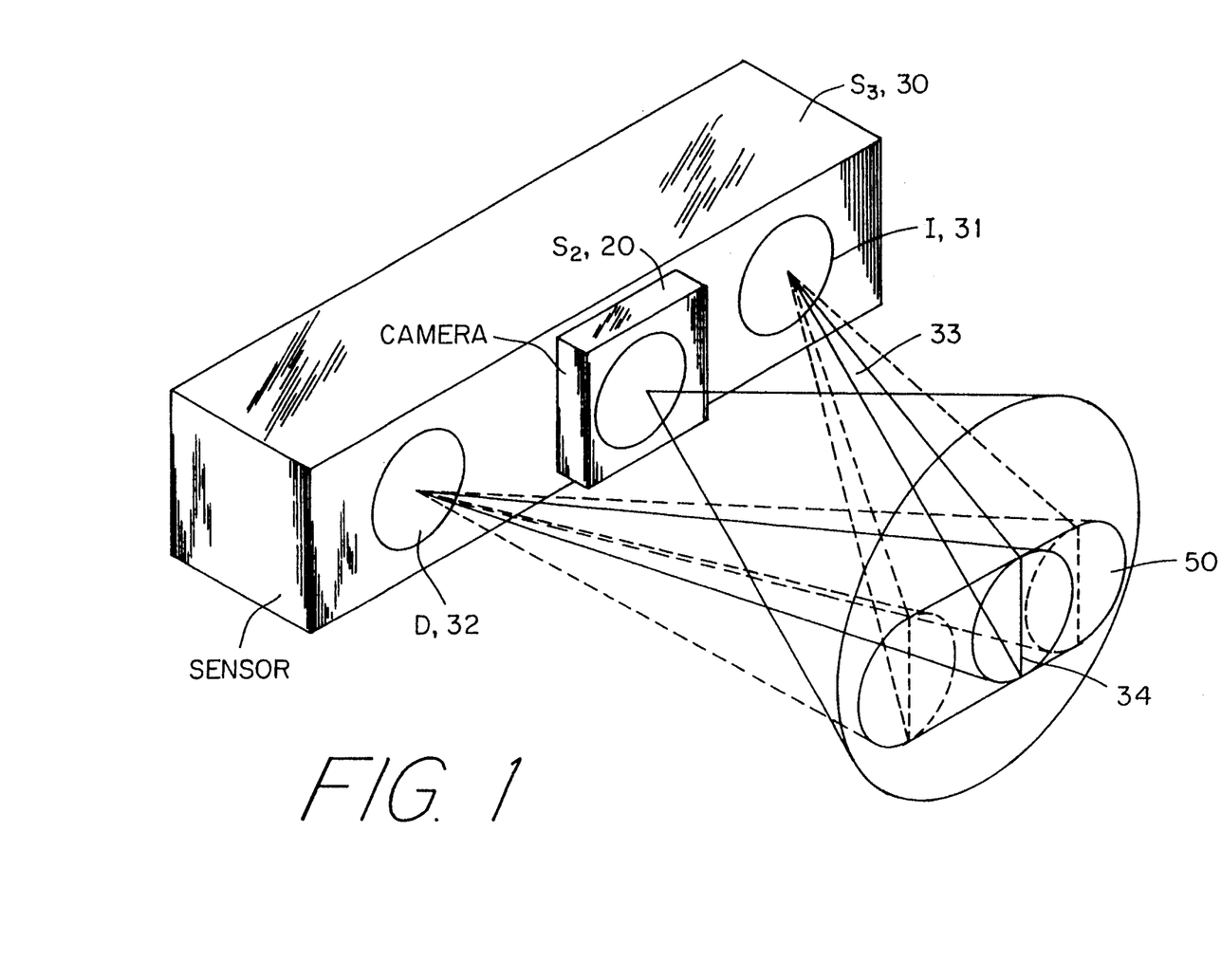
FIG. 1 is a depiction of a fused range and intensity sensory source employing a self scanned sensor as its 3D sensor.
Figure 6:
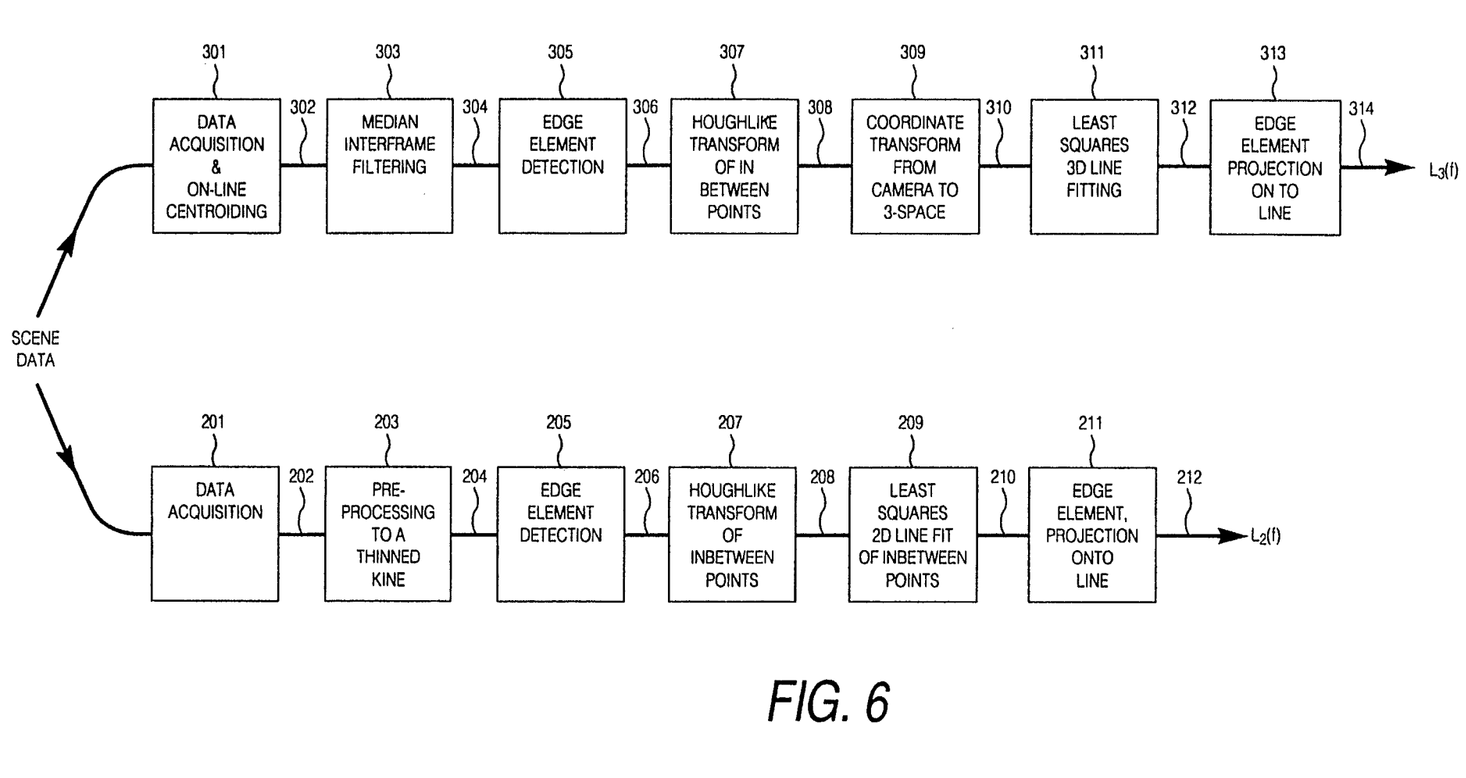
FIG. 6 depicts the operations involved in representation of S3's laser projected stripe, as it traverses across the target, by line segments in both sensory spaces.

A first embodiment FIG. 1 and FIG. 6 of the present invention employs a self scanned three dimensional sensor S3, 30, as its 3D sensor. The sensors are so aligned to have their view volumes partially overlapped, as depicted in FIG. 1. The two sensors retain their post alignment attitudes as long as they are to function as a fused sensory source.

During a calibration process the TV camera S2, 20 is fitted with a spectral notch filter whose pass band is confined to the proximity of the S3 laser wavelength. This is to make S2 impervious to ambient lighting.

Figure 4:
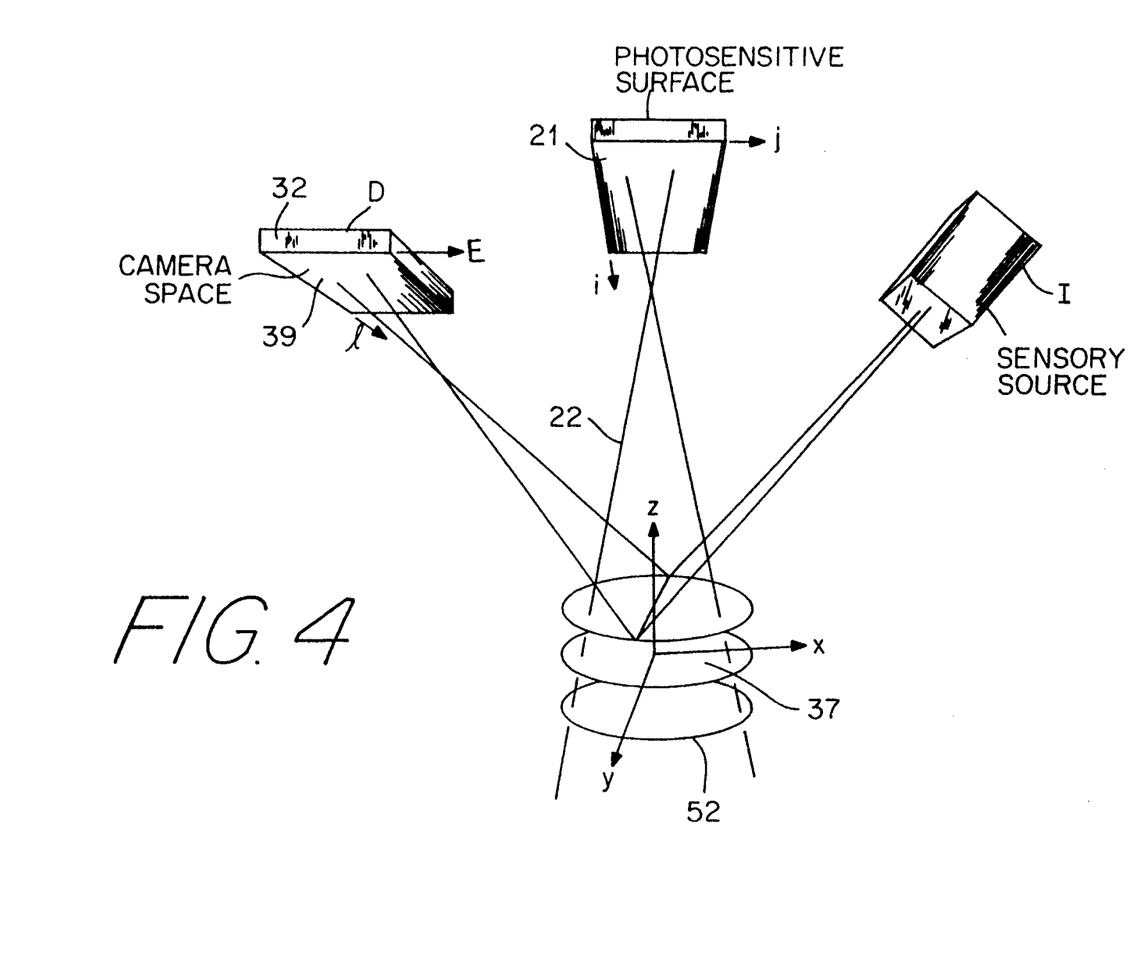
FIG. 4 depicts the various coordinate measurement system of concern in a preferred embodiment of the invention.
Figure 5:
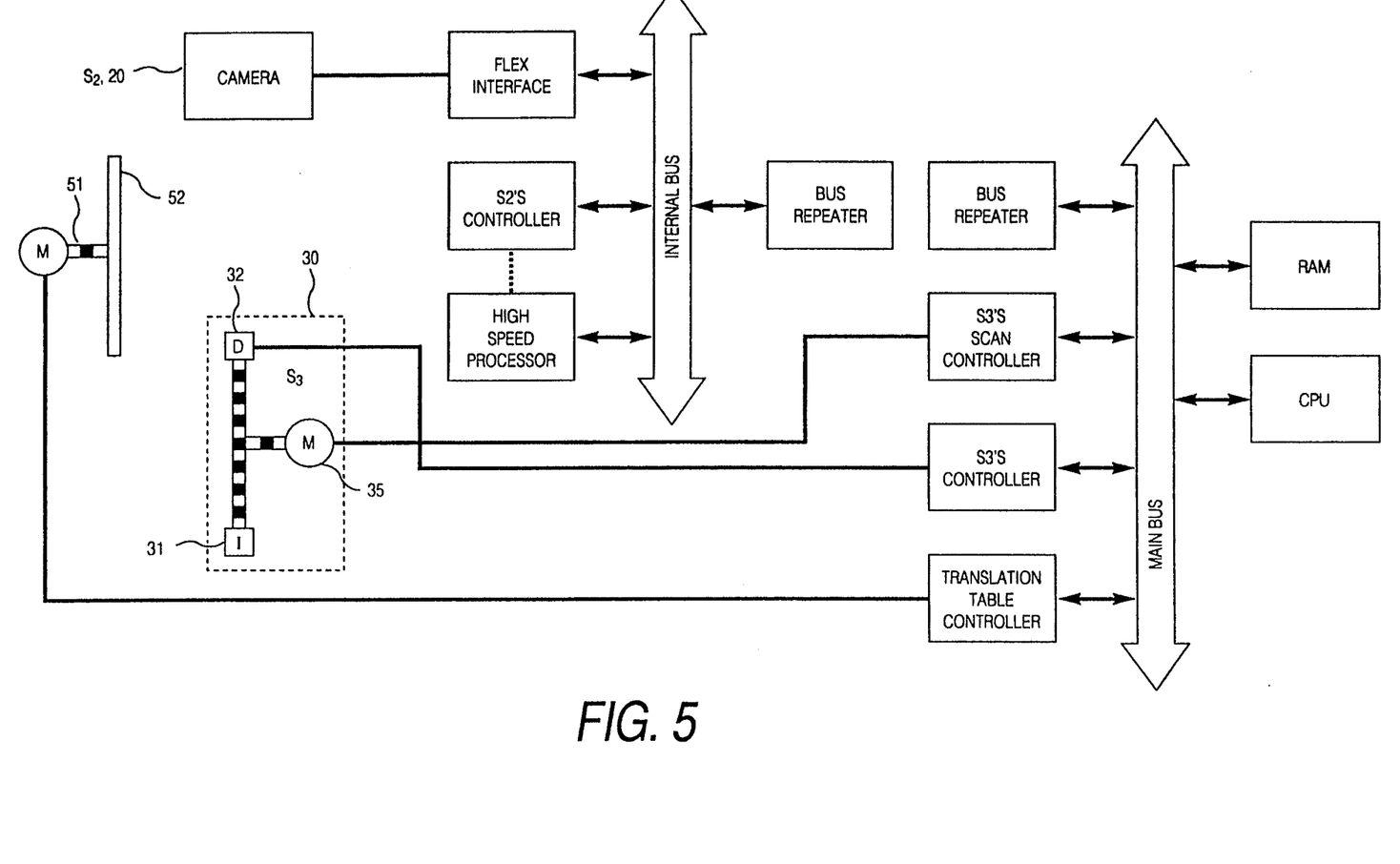
FIG. 5 shows the principal component of the supporting system for a preferred embodiment of the invention.

A rectangular planar slab referred to as target 52 (FIG. 4) is attached to a manual or a motorized translation mechanism 51 (FIG. 5). The said target height must be less than that of the common view volume 50 (FIG. 1) of the said sensors.

The target 52 is placed within the common view volume 50 of the sensory systems, say, at the near end of the view volume. S3 scans its view volume by traversing its laser strips 34 laterally across the target surface through equispaced movement of its stepper motor 35 (FIG. 5). At every position several frames of data are acquired 301 (FIG. 6) with the view to obtain a collection of samples 302 in the camera space of S3 39 (FIG. 4) and noting their medians 303. The resultant medians 304 constitute a frame of data in S3's camera space 39 as denoted by $$\{c(l,f):l = 0 \ldots m-1\} \quad (1)$$

l denotes the camera line number and f is the frame number.

The data exhibit two discontinuities pertaining to the leading and trailing edges 306 of the target 52 which are detected and denoted by $$c(l\_\text{lead},f) \text{ and } c(l\_\text{trail},f) \quad (2)$$

The resultant point set is subjected to a Hough-like transform 307 and points that are not colinear with the longest colinear subset within the said set are discarded.

Next the resultant point sets 308, namely $$\{c(l,f):l = 1\_\text{lead} \ldots 1\_\text{trail}\} \quad (3)$$

is transformed 309 from S3's camera space, to its local sensor space, a cartesian coordinate system 37 (FIG. 4). This operation yields the following two point sets:

$$\{x(l,f),y(l,f),z(l,f):l = 1\_\text{lead}+1 \ldots 1\_\text{trail}-1\} \quad (4)$$

$$\{x(l,f),y(l,f),z(l,f):l = 1\_\text{lead},1\_\text{trail}\} \quad (5)$$

The former of the preceeding two point sets represents the points between the leading and the trailing edges of the target in S3's local sensor space (3-space) while the latter represents the coordinates of the edge points themselves in the same said coordinate system.

The former point sets is then subjected to a least squares three dimensional line fit 311. The latter two edge points are projected onto the said fitted line to form a line segement L3(f) specified by $$\begin{aligned} x &= a(f) \cdot z + b(f) \\ y &= c(f) \cdot z + d(f) \\ \{x(l,f),y(l,f),z(l,f) | l &= l\_\text{lead},1\_\text{trail}\} \end{aligned} \quad (6)$$

While maintaing S3 at the same position (i.e. at a specific step of its stepper motor) with its laser projecting continuously, several snapshots are taken by S2, 20. The acquired images are processed (FIG. 6) to arrive at a binary image of the laser stripe that has been thinned to a single pixel width.

The pixels corresponding to the leading and the trailing edges of the target in S2 space, namely 206

$$\{(i,j):i = i\_\text{lead}, i\_\text{trail}\} \quad (7)$$

are detected. Then the in-between pixels are noted by sampling the thinned line at successive TV line numbers between the said edge points. This yields the following point sets $$\{(i,j):i = i\_\text{lead}+1 \ldots i\_\text{trail}-1\} \quad (8)$$

that are Hough-like tarnsformed 207 as described earlier to discard the non-colinear points. A least squares 2D line of the form $$j = Pi + Q \quad (9)$$

is fitted 209 to the prceeding point sets. Next the said edge points 206 in (7) are projected 211 onto line (9), 210, producing a line segment L2(f), 212, defined by $$\begin{aligned} j &= Pi + Q \\ \{(i,j) | i &= i\_\text{lead}, i\_\text{trail} - 1\} \end{aligned} \quad (10)$$

L3(f), 314 is next sampled at equidistant intervals at as many points as L2(f), 212. The resultant points in the two said sensory spaces are viewed as mapping of one another.

For each (i,j) in s2, 21 (FIG. 4) space the coordinates of the corresponding three dimensional point is recorded in a stem-and-leaf like data structure, in which the stem is a two-dimensional lattice, indexed by i and j with the coordinates of the 3D points forming the leaves. For a description of stem-and-leaf displays see J.

W. Tukey's, Exploratory data anaysis, Addison-Wesley 1977.

The procedure described so far is repeated for every position of the laser stripe as the laser stripe is traversed across the target 52. Moreover, the whole procedure described so far is further repeated for every target position as the target is depressed incrementally through the said common view volume 50.

The result is a populated stem-and-leaf like data structure in which each bin supports many points in 3-space. The points associated with each bin are least squares fitted by a three dimensional line of the form $$x = a(i,j)z + b(i,j)$$
$$y = c(i,j)z + d(i,j)$$
(11)

The coefficients a(i,j), b(i,j), c(i,j) and d(i,j) now replace the coordinates of the said points in the said stem-and-leaf like data structure and specify the equation of the connecting rays 22 (FIG. 4). The extent of this data structure determines the fusable region, that is the region within which data in either sensory spaces may be associated.

A point worthy of note is that for some three dimensional sensor geometries the fuseable region may fall much short of the common view volume 50 of the two said sensors. This may be objectionable in some applications. The next three embodiments are concerned with alleviating such a shortcoming.

Embodiments 2 and 3 extend the data fusion region via extrapolation, while in a fourth embodiment an additional self scanned three dimensional sensor is introduced to the said calibration process, to enable expansion of the fuseable volume, as explained later.

In a second embodiment (FIG. 1 and FIG. 6) the data fusion region is extended only along the laser projected stripe 34. This is achieved by sampling {L3(f)}, 314 and {L2(f)}, 212 specified in (6) and (10) beyond-their respective ends.

Figure 7:
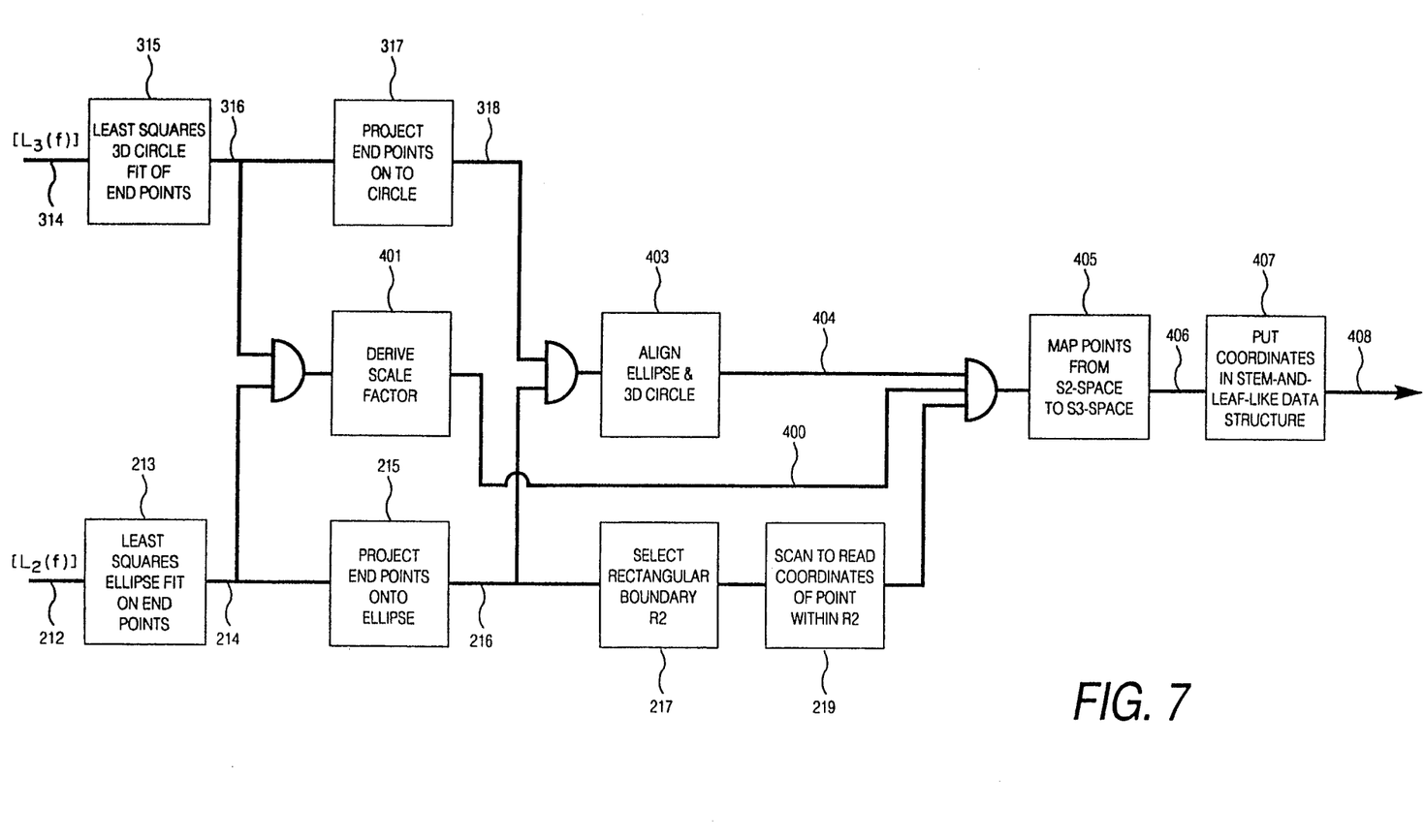
FIG. 7 depicts the operations involved in mapping points from S2 space to S3 space using in a third embodiment of the invention.

In a third embodiment (FIG. 1 and FIG. 7) a circular plate replaces the rectangular slab as target 52. Having established {L3(f)}, 314 and {L2(f)}, 212 for each target position, a circle in 3-space of the form $$Ax + By + Cz + D = 0$$
$$(x - xo)^2 + (y - yo)^2 + (z - zo)^2 = R^2$$
(12)

is least squares fitted 315 to the ends of the said line segments {L3(f)}. The end points of the said line segments are next projected onto the fitted circle 317.

In S2 space an ellipse is fitted 213 to the end points of the line segments {L2(f)}. The end points of the said line segments {L2(f)} are then projected onto the fitted ellipse 215.

Figure 8:
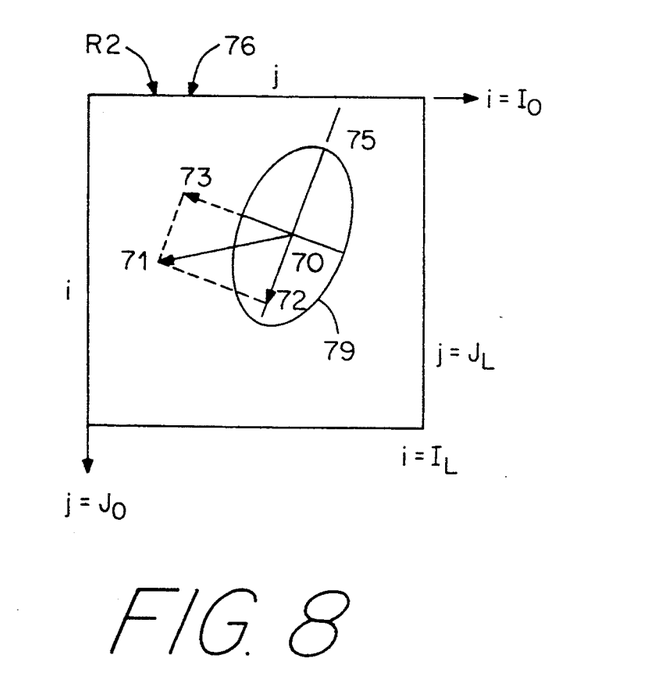
FIG. 8 pertains to a 3rd embodiment of the invention and outlines the ellipse fitted to the ends of the line segments representing S3's imaged stripe in S2 space.
Figure 9:
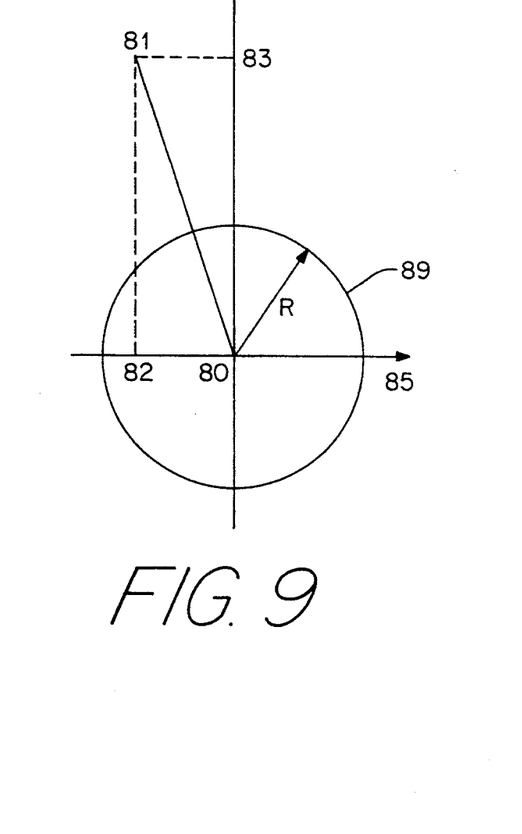
FIG. 9 pertains to a third embodiment of the invention and outlines the 3-space circle fitted to the ends of the line segments representing S3's imaged stripe in S3 space that may be viewed as a mapping of the earlier said ellipse in S2 space. The figure also depicts how points in S2 space may corresponded to those in S3 space.

The points on the said circle 89 (FIG. 9) and the said ellipse 79 (FIG. 8) are two ordered point sets that are mapping of one another in the two sensory spaces as are the said circle and ellipse and are used to align the the said ellipse and the said circle in 3-space 403 (FIG. 7). The said fitted ellipse in S2 space may be viewed as the image of a virtual ellipse in S3 space that lies in a plane parallel to that of the photosensitive plane 21 of the Camera S2 and in turn is a foreshortened projection of the said circle in S3 space through an angle $$\cos^{-1}(b/R)$$

where 2R and 2b denote the major and minor axes of the latter virtual ellipse.

A virtual boundary is subsequently assigned to the S2-space. This may be confined to the photosensitive surface 21 of the camera or may assume a general rectangular bound, R2 76, specified by i=Io, i=Il, j=Jo, and j=Jl. i and j axes are only constrained to remain parallel with and perpendicular to the scan direction in the photosensitive elements of the camera, respectively.

To map any point 71 within R2, 76 onto the S3 space 37, the point is viewed as a vector that starts at the origin of the ellipse 70 and ends at 71 and its components 72 and 73 along the major and minor axes of the ellipse 79 are determined. A scaling transformation 401 relates the lengths of the axes of the fitted ellipse 79 in S2-space to those of the earlier said virtual ellipse that is derived from the circle radius R and the fitted ellipse major axis 75.

Thence in the course of a mapping operation 405, the component along the minor axis is stretched by a factor equal to $$1/\cos(\cos(b/R)) = R/b$$

to account for the earlier said foreshortening, while the component along the major axis remains the same. Hence for every point 71 in S2 space a pairing point 81 is located 3-space.

The resolution with which points in S2-space are sampled can vary in both directions- vertically and laterally.

Figure 2:
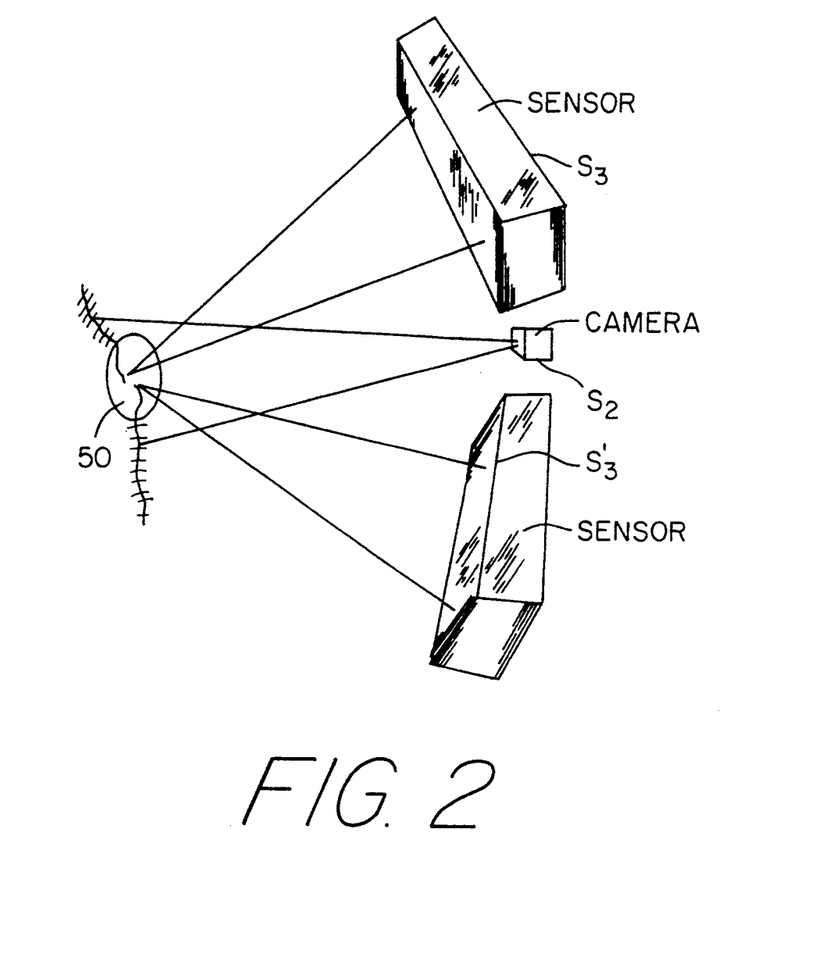
FIG. 2 illustrates how a fused sensory arrangement may be extended to a multitude of sensors.

In a fourth embodiment, (FIG. 2) an additional self scanned 3D sensor, S3', is used in the process of calibration to expand the data fusion region. The latter 3D sensor is so aligned to cover areas in the common view volume 50 of the two sensors that lack sufficient 3D data points to support a satisfactory subsequent least squares fit. S3' is registered against S3. A calibration process as in the first embodiment (FIGS. 1 and 6) is pursued between S3' and S2. However, the resultant ray equations are projected onto the S3 space using the earlier derived intersensor transformation matrix derived through the said registration process.

Figure 3:
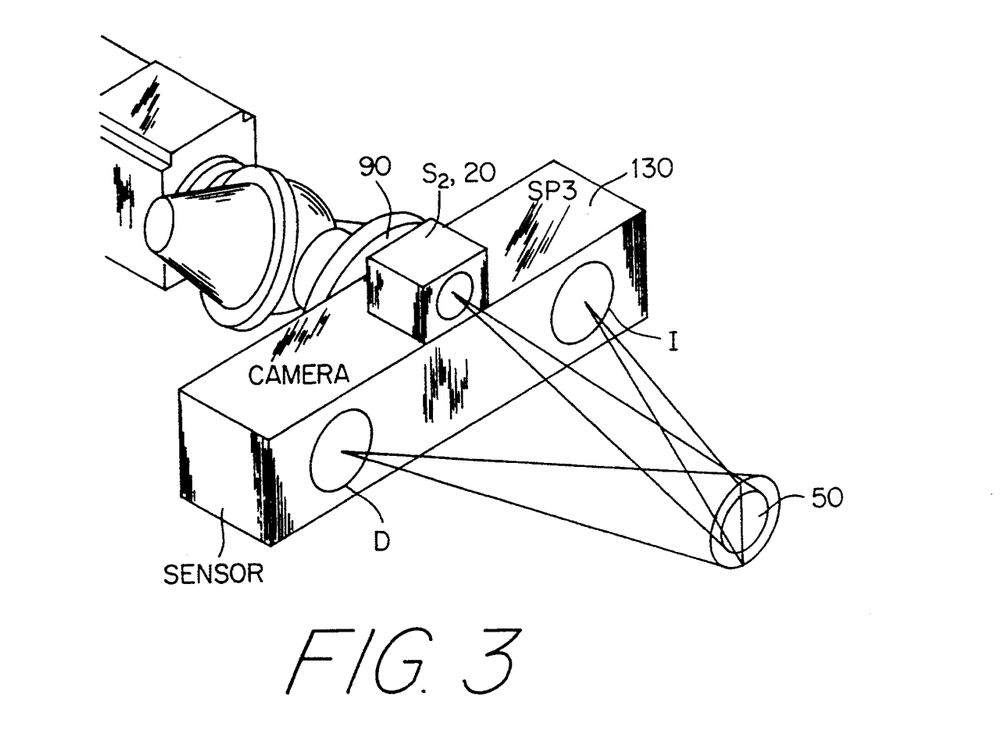
FIG. 3 shows a mounted fused sensory arrangement in which the 3D sensor is a single-plane-of-light sensor.

In yet another embodiment (FIG. 3) of the present invention, the problem of data fusion for a single-plane-of-light three dimensional sensor, SP3 130, whose projected stripe moves in tandem with a conventional TV camera S2, is addressed. An example of this arises in robot borne sensors that is the focuss of this embodiment.

SP3 130 is registered against its supporting robot. The outcome of the registration process is a 4×4 matrix that enables projecting the coordinates of points in the SP3 space onto that of robot last joint-90 to which the sensors are attached. As the last joint to robot base transformation is known, the coordinates of points $$u = [x\ y\ z\ 1]$$

in SP3 space are transformed to the robot base space according to the following transformation $$v = [T][Reg]u$$

where [T] is the transformation matrix relating the coordinate measurement at the last robot arm joint to that of the robot base and [Reg] is also a transformation matrix that allows to to project u onto the robot last joint coordinate system. As the registration process may not be obvious, it is described herein.

SP3 is posed by its supporting robot such that its laser generated light plane projects onto a special registration test pattern. The test pattern is a pyramid groove with a triangular base, that is machined as shown in FIG. 10.

Figure 10:
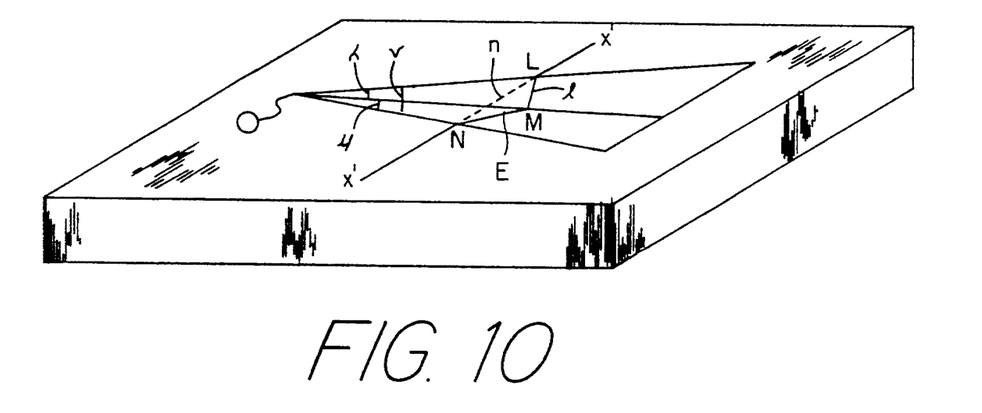
FIG. 10 shows the test pattern devised for registration of the single plane-of-light 3D sensor with its supporting robot or another self scanned 3D sensor.

The groove is imaged at its cross-section with the laser projected plane along XLMNX' as depicted in FIG. 10. The incident data are processed first in the camera space of SP3 with the view to discard any point that deviates more than predefined threshold from the mean of its neighbourhood. Next the frame data is subjected to a break point detection operation which yields edge elements in the vicinity of points L, M, and N. Four point sets are next selected at regular intervals between- and not including- X and L, L and M, M and N, and N and X'. The four point sets are transformed from SP3's camera space to its local 3-space. Each point set is least squares line fitted in 3-space. Also, a least squares plane is fitted to all four said point sets. The earlier three lines are then projected onto the said plane. The resultant projected lines intersect at points L, M, and N.

Distances l=LM, m=MN, and n=NL are thence derived. As the angles $\lambda$, $\mu$, and $\nu$ are known from the geometry of the machined groove then distances a, b, and c from the vertex of the pyramid to said points L, M and N are computed. The physical location of the three said points L, M, and N on the groove are marked and subsequently touched by the robot. Correspondence of these non-colinear points in the robot last joint space and also in the sp3's space yields the desired registration matrix.

A self scanned optical triangulation based three dimensional sensor S3 is also mounted in such a way to share part of its view volume by S2.

S3 undergoes a registration process in which it only needs to locate the vertex O of the grooved pyramid, FIG. 10, and the two lines OL and OM. As distances OL, OM, and ON are already known, hence points L, M and N are located within S3's space. Thus a registration matrix relating S3's space to that of the robot is derived.

A calibration process as in embodiments 1, 2, or 3 enables to establish the equation of the connecting rays in the S3 local 3-space coordinates. The coefficients describing the ray equations reside in the said stem-and-leaf like data structure. In a final operation the ray equations are projected on the robot base and the resulting coefficients replace those earlier expressed in S3 space in the same said stem-and-leaf like data structure. S3 is next removed leaving SP3 and S2 to operate as fused range and intensity sensory source.

The steps specified in embodiment 5 (FIG. 3) can yet be implemented in another order. A self-scanned camera S3 is calibrated with an independent TV camera S2 as described in embodiments 1,2,3 or 4. The single plane-of-light three dimensional sensor, SP3, is next aligned with S3 and fixed with respect to the two other sensors. SP3 is then registered against S3 using the test pattern of FIG. 10, as in embodiment 5. The ray equations are then projected onto the SP3 space and the ray coefficients replace those in the data fusion table. S3 is then detached. SP3 and S2 then form a fused range and intensity sensory source as long as they retain their relative positions and attitudes and when mounted on a robot arm SP3 is registered against its supporting robot as described earlier in embodiment 5. The ray equations in the data fusion table are projected onto the robot base space.

What is claimed is:

1. A calibration process with a self-scanned active three dimensional optical triangulation-based sensor and an independent TV camera and a planar target to provide a fused sensory source for subsequent complete data fusion of a scene imaged by both its constituent sensory systems, and is not constrained by absence of spatial or spectral structures in the scene, said calibration process comprising the steps: of aligning two sensors with view volumes so that their view volumes partially overlap; imaging a laser-projected stripe of a self-scanned 3D sensor at every step by both sensory systems as the stripe is being traversed at steps commensurate with a desired lateral resolution across a target comprising a planar rectangular slab; processing imaged lasers stripes to yield a set of corresponding least squares fitted line segments in a first sensory space and a second sensory space arising from least squares line fitting of preprocessed and Hough-like transformed points between leading and trailing edge elements of the imaged stripe at every step and projection of the said edge elements onto said lines in both said spaces; sampling corresponding line segments at equal numbers of equidistant intervals to a desired vertical resolution to yield two ordered point sets that are a mapping of one another; recording coordinates of 3D points against those of corresponding points in said second space; repeating all said steps as the target is being depressed through the overlapping view volume; and least squares line fitting in three space coordinate measurement system of said first space, said second space having resolution cells, three space points corresponding to each resolution cell of said second space; viewing line equations as those of rays connecting said second space resolution cells to their corresponding three space points; and storing thereafter said equations along with their corresponding second space resolution cells in a data fusion table for subsequent data fusion during runtime.

2. A calibration process as defined in claim 1, including the step of producing subsequent fusion of data from subpixel to arbitrary coarser resolutions.

3. A calibration process as defined in claim 1, including the step of controlling said independent TV camera in said fused sensory source under ambient illumination provided by a source other than said self-scanned 3D sensor.

4. A calibration process as defined in claim 1, including the step of introducing an additional self-scanned 3D sensor for extending a data fusion region.

5. A calibration process as defined in claim 1, including the step of: providing a plurality of independent cameras with adjacent 3D sensors, said independent cameras and said adjacent sensors having each a field of view; and spanning each field of view by the respective camera over the field of view of the adjacent sensor for obtaining additional data on intensity images.

6. A calibration process as defined in claim 1, wherein said fused sensory source is formed from a single plane of light sensor and a TV camera moving in tandem with one another.

7. A calibration process as defined in claim 1, including the step of producing a test pattern for registering a single plane of light optical triangulation based 3D sensor against a supporting robot arm.

8. A calibration process as defined in claim 1, including the step of controlling said independent TV camera in said fused sensory source under ambient illumination provided by said self-scanned 3D sensor.

9. A calibration process as defined in claim 1, including the step of producing a test pattern for registering a single plane of light optical triangulation based 3D sensor against another self-scanned 3D sensor.

10. A calibration process as defined in claim 1, including the step of extrapolating for extending a data fusion region along a laser projected stripe of said self-scanned 3D sensor.

11. A calibration process is defined in claim 10, wherein the data fusion region is extended in directions along said laser projected stripe and across said target, said target comprising a circular disc; least squares fitting circles in said first sensory space; least squares fitting an ellipse in said second sensory space, correspondence between the least squares fitted circles and the least squares fitted ellipse being to ends of line segments representing said imaged stripe.

12. A calibration process as defined in claim 1, wherein a flying spot based sensor is calibrated.

13. A calibration process as defined in claim 12, including the step of producing equations of rays extending to polynomials dependent on uncorrected aberrations.

* * * * *